United States Patent
Kubo et al.

(10) Patent No.: US 12,091,324 B2
(45) Date of Patent: Sep. 17, 2024

(54) METHOD FOR PRODUCING HALIDE

(71) Applicant: Panasonic Intellectual Property Management Co., Ltd., Osaka (JP)

(72) Inventors: Takashi Kubo, Hyogo (JP); Yusuke Nishio, Osaka (JP); Akihiro Sakai, Nara (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 607 days.

(21) Appl. No.: 17/323,933

(22) Filed: May 18, 2021

(65) Prior Publication Data
US 2021/0269325 A1    Sep. 2, 2021

Related U.S. Application Data

(63) Continuation of application No. PCT/JP2019/025435, filed on Jun. 26, 2019.

(30) Foreign Application Priority Data

Dec. 26, 2018   (JP) ................................. 2018-243602

(51) Int. Cl.
   *C01F 17/36* (2020.01)
   *H01B 1/06* (2006.01)
   *H01M 10/0562* (2010.01)

(52) U.S. Cl.
   CPC .......... *C01F 17/36* (2020.01); *C01P 2006/40* (2013.01); *H01B 1/06* (2013.01); *H01M 10/0562* (2013.01); *H01M 2300/008* (2013.01)

(58) Field of Classification Search
   None
   See application file for complete search history.

(56) References Cited

U.S. PATENT DOCUMENTS

| 2011/0272585 | A1  | 11/2011 | Yang et al. |
| 2016/0103232 | A1* | 4/2016 | Ouspenski .............. C30B 15/04 117/78 |
| 2017/0139059 | A1  | 5/2017 | Ouspenski et al. |
| 2018/0246230 | A1  | 8/2018 | Ouspenski et al. |

(Continued)

FOREIGN PATENT DOCUMENTS

| CN | 107794566 A | 3/2018 |
| CN | 108004591   | 5/2018 |

(Continued)

OTHER PUBLICATIONS

Bohnsack, A., et al. Ternary halides of the A3MX6 type. VII. The bromides Li3MBr6 (M = Sm—Lu, Y): Synthesis, crystal structure, and ionic mobility. Z. anorg. allg. Chem. 623 (1997) 1352-1356. (Year: 1997).*

(Continued)

*Primary Examiner* — Anthony J Zimmer
*Assistant Examiner* — Zachary John Baum
(74) *Attorney, Agent, or Firm* — Rimon P.C.

(57) ABSTRACT

A production method for producing a halide includes heat-treating, in an inert gas atmosphere, a mixed material in which LiCl and YCl₃ are mixed. In the heat-treatment, the mixed material is heat-treated at higher than or equal to 200° C. and lower than or equal to 650° C.

5 Claims, 4 Drawing Sheets

(56) References Cited

U.S. PATENT DOCUMENTS

| | | |
|---|---|---|
| 2019/0088995 A1 | 3/2019 | Asano et al. |
| 2019/0097267 A1 | 3/2019 | Yokoyama et al. |
| 2019/0107636 A1 | 4/2019 | Ouspenski et al. |
| 2019/0245240 A1 | 8/2019 | Park et al. |
| 2020/0212481 A1 | 7/2020 | Nagamine et al. |
| 2020/0335817 A1 | 10/2020 | Asano et al. |

FOREIGN PATENT DOCUMENTS

| | | |
|---|---|---|
| CN | 108701860 A | 10/2018 |
| CN | 108899580 A | 11/2018 |
| CN | 109075390 A | 12/2018 |
| CN | 111279432 A | 6/2020 |
| CN | 111295789 A | 6/2020 |
| EP | 3496202 A1 | 6/2019 |
| EP | 3736820 A1 | 11/2020 |
| EP | 3736831 A4 | 3/2021 |
| EP | 3736833 A4 | 3/2021 |
| EP | 3736834 A4 | 3/2021 |
| EP | 3736897 A4 | 3/2021 |
| EP | 3745422 A4 | 3/2021 |
| JP | 2016-522135 | 7/2016 |
| JP | 2017-168395 A | 9/2017 |
| JP | 2017-220339 | 12/2017 |
| WO | 2018/025582 | 2/2018 |
| WO | 2018/062770 A1 | 4/2018 |

OTHER PUBLICATIONS

Annotated Bohnsack, A., et al. Ternary halides of the A3MX6 type. VI. Ternary halides Li3MCl6 (M = Tb—Lu, Y, Sc): Synthesis, crystal structures, and ionic motion. Z. anorg. allg. Chem. 623 (1997) 1067-1073. (Year: 1997).*

Annotated Combes, C. M., et al. Optical and scintillation properties of pure and Ce3+-doped Cs2LiYCl6 and Li3YCl6:Ce3+ crystals. Journal of Luminescence 82 (1999) 299-305. (Year: 1999).*

English Translation of Chinese Search Report dated Dec. 5, 2022 for the related Chinese Patent Application No. 201980062307.5.

English Translation of Chinese Search Report dated Dec. 28, 2022 for the related Chinese Patent Application No. 201980060798.X.

The Indian Office Action dated Dec. 29, 2022 for the related Indian Patent Application No. 202147024385.

The Indian Office Action dated Jan. 20, 2023 for the related Indian Patent Application No. 202147024572.

International Search Report of PCT application No. PCT/JP2019/025435 dated Oct. 1, 2019.

Andreas Bohnsack et al., "The bromides Li3MBr6 (M=Sm—Lu, Y): Synthesis, Crystal Structure, and Ionic Mobility", Journal of inorganic and General Chemistry, Sep. 1997, vol. 623/Issue 9, pp. 1352-1356.

Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of inorganic and General Chemistry, Jul. 1997, vol. 623/Issue 7, pp. 1067-1073.

H. - J. Steiner et al., "Novel Fast Ion Conductors of the Type MI3MIIICl6 (MI=Li, Na, Ag; MIII=In, Y)", Zeitschrift fur anorganische und allgemeine Chemie, Jul. 1992, vol. 613, pp. 26-30 (Partial Translation).

The Extended European Search Report dated Jan. 21, 2022 for the related European Patent Application No. 19902576.8.

The Extended European Search Report dated Jan. 28, 2022 for the related European Patent Application No. 19901581.9.

The Extended European Search Report dated Jan. 13, 2022 for the related European Patent Application No. 19902261.7.

The Extended European Search Report dated Jan. 28, 2022 for the related European Patent Application No. 19902747.5.

The Extended European Search Report dated Jan. 14, 2022 for the related European Patent Application No. 19904337.3.

The Extended European Search Report dated Jan. 14, 2022 for the related European Patent Application No. 19905741.5.

Tetsuya Asano et al., "Solid Halide Electrolytes with High Lithium-Ion Conductivity for Application in 4 V Class Bulk-Type All-Solid-State Batteries", Advanced Materials, vol. 30, No. 44, Sep. 14, 2018 (Sep. 14, 2018), pp. 1-7, XP055721991.

Kwon Young-Soon et al., "Ball temperatures during mechanical alloying in planetary mills", Journal of Alloys and Compounds, vol. 346, No. 1, Jan. 1, 2002 (Jan. 1, 2002), pp. 276-281, XP085622434.

English Translation of Chinese Search Report dated Mar. 30, 2023 for the related Chinese Patent Application No. 201980066255.9.

English Translation of Chinese Search Report dated Aug. 11, 2023 for the related Chinese Patent Application No. 201980069385.8.

* cited by examiner

METHOD FOR PRODUCING HALIDE

BACKGROUND

1. Technical Field

The present disclosure relates to a production method for producing a halide.

2. Description of the Related Art

International Publication No. 2018/025582 discloses a production method for producing a halide solid electrolyte.

SUMMARY

In existing technology, it is desired to produce a halide by a method having industrially high productivity.

In one general aspect, the techniques disclosed here feature a production method for producing a halide including heat-treating, in an inert gas atmosphere, a mixed material in which LiCl and YCl$_3$ are mixed, in which the mixed material is heat-treated at higher than or equal to 200° C. and lower than or equal to 650° C.

According to the present disclosure, a halide can be produced by a method having industrially high productivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments will be described below with reference to the drawings.

Embodiment 1

Figure 1:
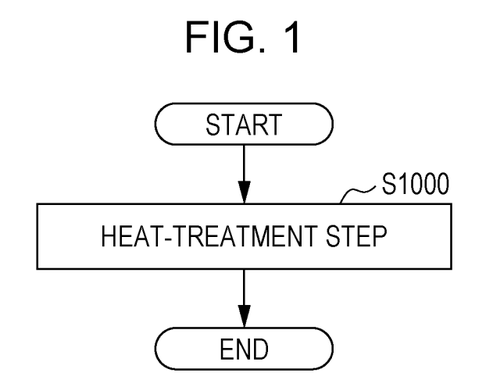
FIG. 1 is a flowchart showing an example of a production method in Embodiment 1.

FIG. 1 is a flowchart showing an example of a production method in Embodiment 1.

A production method in Embodiment 1 includes a heat-treatment step S1000.

The heat-treatment step S1000 is a step of heat-treating a mixed material in an inert gas atmosphere. The mixed material heat-treated in the heat-treatment step S1000 is a material in which LiCl (i.e., lithium chloride) and YCl$_3$ (i.e., yttrium chloride) are mixed. In the heat-treatment step S1000, the mixed material is heat-treated at higher than or equal to 200° C. and lower than or equal to 650° C.

According to the structure described above, a halide can be produced by a method having industrially high productivity (e.g., a method enabling low-cost mass production). That is, without using a vacuum-sealed tube and a planetary ball mill, a chloride containing Li (i.e., lithium) and Y (i.e., yttrium) can be produced by a simple and easy production method (i.e., heat-treatment in an inert gas atmosphere).

In the heat-treatment step S1000, for example, powder of the mixed material may be placed in a container (e.g., a crucible) and heat-treated in a heating furnace. In this case, the state in which the mixed material is heated to a temperature of "higher than or equal to 200° C. and lower than or equal to 650° C." in an inert gas atmosphere may be held for more than or equal to a predetermined time. Furthermore, the heat-treatment time may be a time period that does not cause a compositional change of a heat-treated product due to volatilization of a halide or the like (i.e., does not impair the ionic conductivity of the heat-treated product).

Note that as the inert gas, helium, nitrogen, argon, or the like can be used.

Furthermore, after the heat-treatment step S1000, the heat-treated product may be taken out of the container (e.g., a crucible) and pulverized. In this case, the heat-treated product may be pulverized with a pulverizing apparatus (e.g., a mortar, mixer, or the like).

Furthermore, the mixed material in the present disclosure may be a material in which only two materials, i.e., LiCl and YCl$_3$, are mixed. Alternatively, the mixed material in the present disclosure may be further mixed with another material different from LiCl or YCl$_3$, in addition to LiCl and YCl$_3$.

Furthermore, in the present disclosure, the mixed material may be further mixed with M$_\alpha$A$_\beta$, where M includes at least one element selected from the group consisting of Na, K, Ca, Mg, Sr, Ba, Zn, In, Sn, Bi, La, Ce, Pr, Nd, Pm, Sm, Eu, Gd, Tb, Dy, Ho, Er, Tm, Yb, and Lu; A is at least one element selected from the group consisting of Cl, Br, and I; and $\alpha>0$ and $\beta>0$ are satisfied.

According to the structure described above, it is possible to improve the properties (e.g., ionic conductivity and the like) of a halide produced by the production method of the present disclosure.

Note that, when "$\alpha=1$", "$2\leq\beta\leq5$" may be satisfied.

Furthermore, in the present disclosure, the mixed material may be further mixed with at least one of LiF or YF$_3$.

According to the structure described above, it is possible to improve the properties (e.g., ionic conductivity and the like) of a halide produced by the production method of the present disclosure.

Furthermore, in the present disclosure, the mixed material may be mixed with a material in which a part of Li in LiCl (or a part of Y in YCl$_3$) is replaced with substituting cation species (e.g., M described above). Furthermore, the mixed material may be mixed with a material in which a part of Cl in LiCl (or a part of Cl in YCl$_3$) is replaced with F (i.e., fluorine).

Figure 2:
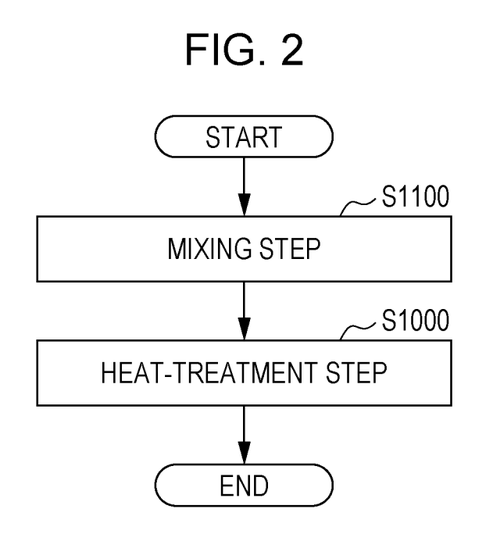
FIG. 2 is a flowchart showing an example of the production method in Embodiment 1.

FIG. 2 is a flowchart showing an example of the production method in Embodiment 1. As shown in FIG. 2, the production method in Embodiment 1 may further include a mixing step S1100.

The mixing step S1100 is a step carried out before the heat-treatment step S1000. In the mixing step S1100, a mixed material (i.e., a material to be heat-treated in the heat-treatment step S1000) is obtained by mixing LiCl and YCl$_3$ serving as starting materials.

In the mixing step S1100, LiCl and YCl$_3$ may be weighed so as to have a desired molar ratio and mixed. As the mixing method for mixing the starting materials, a method in which a commonly known mixing apparatus (e.g., a mortar, blender, ball mill, or the like) is used may be employed. For example, in the mixing step S1100, powders of the starting materials may be prepared and mixed. In this case, in the heat-treatment step S1000, a mixed material in the form of powder may be heat-treated. Furthermore, the mixed material in the form of powder obtained in the mixing step S1100 may be shaped into pellets by uniaxial pressing. In this case, in the heat-treatment step S1000, by heat-treating the mixed material in the form of pellets, a halide may be produced.

Furthermore, in the mixing step S1100, a mixed material may be obtained by mixing, in addition to LiCl and $YCl_3$, another starting material different from LiCl or $YCl_3$ (e.g., $M_\alpha A_\beta$, LiF, $YF_3$, or the like described above).

Note that in the mixing step S1100, a mixed material may be obtained by mixing "a starting material containing LiCl as a main component" and "a starting material containing $YCl_3$ as a main component".

Figure 3:
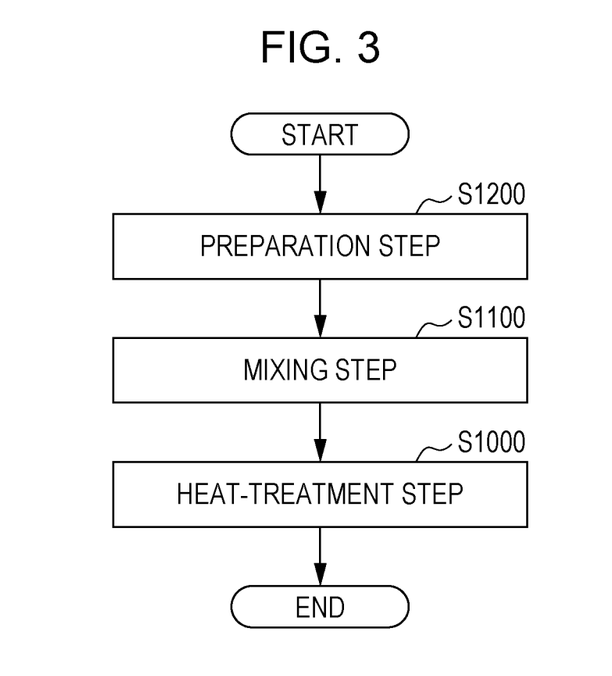
FIG. 3 is a flowchart showing an example of the production method in Embodiment 1.

FIG. 3 is a flowchart showing an example of the production method in Embodiment 1. As shown in FIG. 3, the production method in Embodiment 1 may further include a preparation step S1200.

The preparation step S1200 is a step carried out before the mixing step S1100. In the preparation step S1200, starting materials such as LiCl and $YCl_3$ (i.e., materials to be mixed in the mixing step S1100) are prepared.

In the preparation step S1200, starting materials such as LiCl and $YCl_3$ may be obtained by synthesizing materials. Alternatively, in the preparation step S1200, commonly known, commercially available products (e.g., materials with a purity of greater than or equal to 99%) may be used. Note that dry materials may be used as the starting materials. Furthermore, starting materials in the form of crystals, aggregates, flakes, powder, or the like may be used as the staring materials. In the preparation step S1200, starting materials in the form of powder may be obtained by pulverizing starting materials in the form of crystals, aggregates, or flakes.

In the preparation step S1200, any one or two or more of $M_\alpha A_\beta$ (where M is at least one element selected from the group consisting of Na, K, Ca, Mg, Sr, Ba, Zn, In, Sn, Bi, La, Ce, Pr, Nd, Pm, Sm, Eu, Gd, Tb, Dy, Ho, Er, Tm, Yb, and Lu; A is at least one element selected from the group consisting of Cl, Br, and I; and when "$\alpha=1$", "$2\leq\beta\leq5$" is satisfied), LiF, and $YF_3$ may be added. In this way, it is possible to improve the properties (e.g., ionic conductivity and the like) of a halide obtained by the production method of the present disclosure.

Note that in the preparation step S1200, a starting material in which a part of Li in LiCl (or a part of Y in $YCl_3$) is replaced with substituting cation species (e.g., M described above) may be prepared. Furthermore, in the preparation step S1200, a starting material in which a part of Cl in LiCl (or a part of Cl in $YCl_3$) is replaced with F (i.e., fluorine) may be prepared.

Note that the halide produced by the production method of the present disclosure can be used as a solid electrolyte material. In this case, the solid electrolyte material may be, for example, a solid electrolyte having lithium ion conductivity. In this case, the solid electrolyte material can be used, for example, as a solid electrolyte material used in all-solid-state lithium secondary batteries.

Embodiment 2

Embodiment 2 will be described below. Descriptions that are duplicate of those in Embodiment 1 will be omitted appropriately.

A production method in Embodiment 2 has the following feature in addition to the feature of the production method in Embodiment 1 described above.

In the heat-treatment step S1000 of the production method in Embodiment 2, the mixed material in which LiCl and $YCl_3$ are mixed is heat-treated at higher than or equal to 400° C. and lower than or equal to 650° C.

According to the structure described above, a chloride having high ionic conductivity can be produced by a method having industrially high productivity. That is, by setting the heat-treatment temperature to be higher than or equal to 400° C., LiCl and $YCl_3$ are allowed to react with each other sufficiently. Furthermore, by setting the heat-treatment temperature to be lower than or equal to 650° C., it is possible to suppress thermal decomposition of a chloride formed by a solid phase reaction. Thus, the ionic conductivity of a chloride, which is a heat-treated product, can be further enhanced. That is, for example, a high-quality chloride solid electrolyte can be obtained.

Furthermore, in the heat-treatment step S1000 of the production method in Embodiment 2, the mixed material may be heat-treated at higher than or equal to 480° C. (e.g., higher than or equal to 480° C. and lower than or equal to 650° C.).

According to the structure described above, a chloride having higher ionic conductivity can be produced by a method having industrially high productivity. That is, by setting the heat-treatment temperature to be higher than or equal to 480° C., the crystallinity of a chloride, which is a heat-treated product, can be further enhanced. Thus, the ionic conductivity of a chloride, which is a heat-treated product, can be further enhanced. That is, for example, a higher-quality chloride solid electrolyte can be obtained.

Furthermore, in the heat-treatment step S1000 of the production method in Embodiment 2, the mixed material may be heat-treated at lower than or equal to 600° C. (e.g., higher than or equal to 400° C. and lower than or equal to 600° C., or higher than or equal to 480° C. and lower than or equal to 600° C.).

According to the structure described above, a chloride having higher ionic conductivity can be produced by a method having industrially high productivity. That is, by setting the heat-treatment temperature to be lower than or equal to 600° C., heat-treatment can be performed at a temperature lower than the melting point of LiCl (i.e., 605° C.), and decomposition of LiCl can be suppressed. (Note that the melting point of $YCl_3$ is about 720° C., and decomposition of $YCl_3$ can also be suppressed.) Thus, the ionic conductivity of a chloride, which is a heat-treated product, can be further enhanced. That is, for example, a higher-quality chloride solid electrolyte can be obtained.

Furthermore, in the heat-treatment step S1000 of the production method in Embodiment 2, the mixed material may be heat-treated for more than or equal to 1 hour and less than or equal to 24 hours.

According to the structure described above, a chloride having higher ionic conductivity can be produced by a method having industrially high productivity. That is, by setting the heat-treatment time to be more than or equal to 1 hour, LiCl and $YCl_3$ are allowed to react with each other sufficiently. Furthermore, by setting the heat-treatment time to be less than or equal to 24 hours, volatilization of a chloride, which is a heat-treated product, can be suppressed, and it is possible to obtain a chloride having a desired compositional ratio of constituent elements (i.e., a compositional change can be suppressed). Thus, the ionic conductivity of a chloride, which is a heat-treated product, can be further enhanced. That is, for example, a higher-quality chloride solid electrolyte can be obtained.

Furthermore, in the heat-treatment step S1000 of the production method in Embodiment 2, the mixed material may be heat-treated for less than or equal to 10 hours (e.g., more than or equal to 1 hour and less than or equal to 10 hours).

According to the structure described above, by setting the heat-treatment time to be less than or equal to 10 hours, volatilization of a chloride, which is a heat-treated product, can be further suppressed, and it is possible to obtain a chloride having a desired compositional ratio of constituent elements (i.e., a compositional change can be suppressed). Thus, it is possible to further suppress a decrease in the ionic conductivity of a chloride, which is a heat-treated product, due to a compositional change.

Furthermore, in the mixing step S1100 of the production method in Embodiment 2, the mixing molar ratio of LiCl to $YCl_3$ may be adjusted by weighing LiCl and $YCl_3$ so as to have a desired molar ratio, followed by mixing.

For example, in Embodiment 2, LiCl and $YCl_3$ may be mixed at a molar ratio of LiCl:$YCl_3$="4.2:0.6" to "2.4:1.2". Alternatively, LiCl and $YCl_3$ may be mixed at a molar ratio of LiCl:$YCl_3$="3:1" to "2.7:1.1".

Furthermore, in the mixing step S1100 of the production method in Embodiment 2, the mixed material may be obtained by further mixing $M_\alpha Cl_\beta$ (i.e., a compound represented by $M_\alpha A_\beta$ in Embodiment 1 where "A" is Cl), in addition to LiCl and $YCl_3$. In this case, in the preparation step S1200 of the production method in Embodiment 2, the $M_\alpha Cl_\beta$ may be prepared as a starting material.

EXAMPLES

Details of the present disclosure will be described below using examples and reference examples. These are merely exemplary and do not limit the present disclosure. In the following examples, halides produced by a production method according to the present disclosure are produced as solid electrolyte materials and evaluated.

Example 1

(Production of Solid Electrolyte Material)

In an argon atmosphere with a dew point of lower than or equal to −60° C., LiCl and $YCl_3$ were weighed so as to satisfy a molar ratio of LiCl:$YCl_3$=3:1. These materials were pulverized and mixed with a mortar made of agate. The resulting mixture was placed in a crucible made of alumina, heated to 500° C. in an argon atmosphere, and held for one hour. After heat-treatment, the material was pulverized with a mortar made of agate to produce a solid electrolyte material of Example 1.

The Li content per unit weight in the whole solid electrolyte material of Example 1 was measured by atomic absorption spectrometry, and the Y content was measured by ICP emission spectroscopic analysis. The content ratio Li:Y was converted to a molar ratio. The ratio Li:Y was 3:1, which was the same ratio as prepared.

(Evaluation of Ionic Conductivity)

Figure 4:
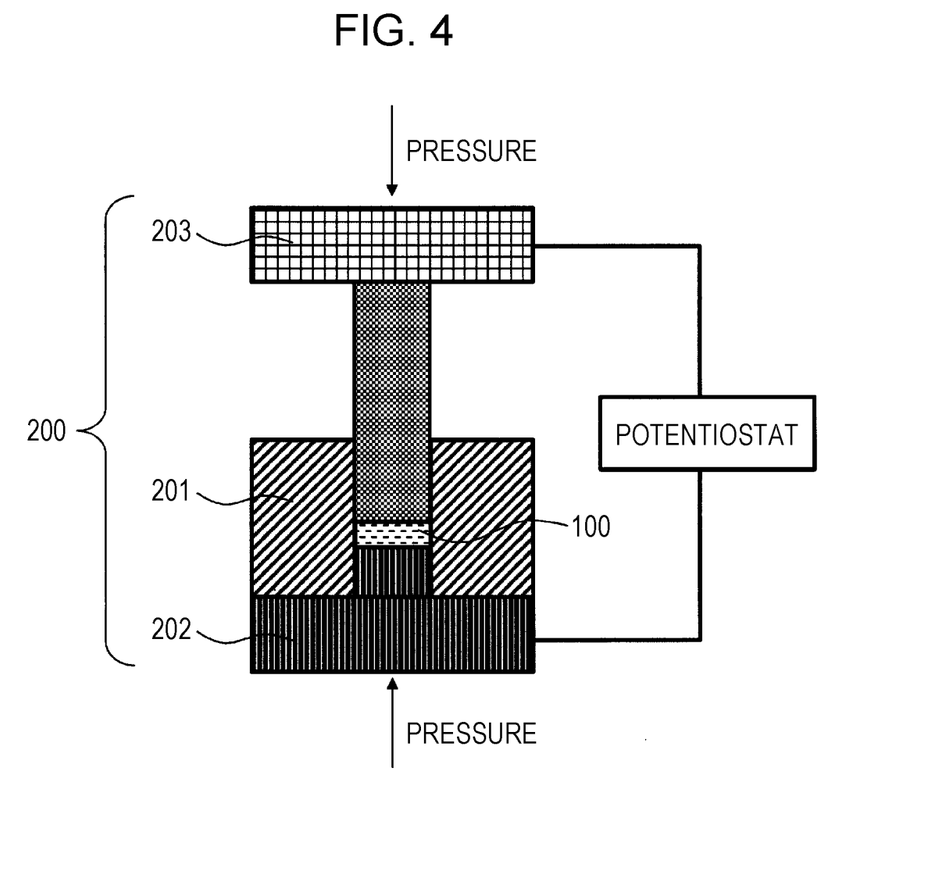
FIG. 4 is a schematic diagram showing a method for evaluating ionic conductivity.

FIG. 4 is a schematic diagram showing a method for evaluating ionic conductivity.

A pressure-molding die 200 includes a die 201 which is made of electronically insulating polycarbonate, and an upper punch 203 and a lower punch 202 which are made of electronically conductive stainless steel.

Ionic conductivity was evaluated by the following method using the structure shown in FIG. 4.

In a dry atmosphere with a dew point of lower than or equal to −60° C., the pressure-molding die 200 was filled with solid electrolyte powder 100, which is powder of the solid electrolyte material of Example 1, and uniaxial pressing was performed at 300 MPa to produce a conductivity measurement cell of Example 1. In the pressurized state, lead wires were extended from the upper punch 203 and the lower punch 202 and connected to a potentiostat (Princeton Applied Research, VersaSTAT4) equipped with a frequency response analyzer. The ionic conductivity at room temperature was measured by an electrochemical impedance measurement method.

Figure 5:
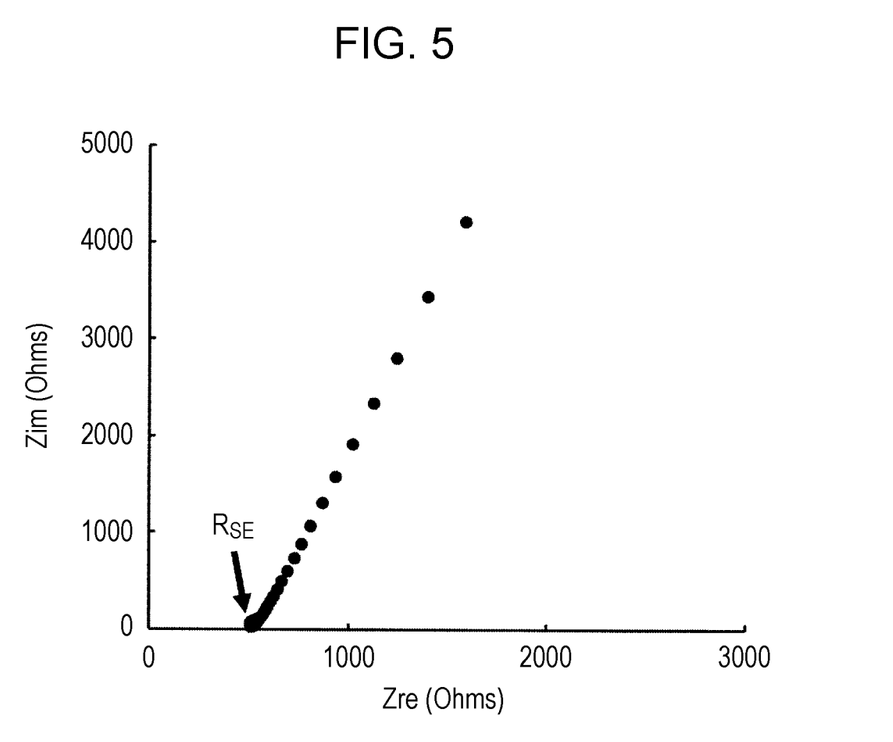
FIG. 5 is a graph showing the results of evaluation of ionic conductivity by AC impedance measurement.

FIG. 5 is a graph showing the results of evaluation of ionic conductivity by AC impedance measurement. FIG. 5 shows a Cole-Cole diagram of the impedance measurement results.

In FIG. 5, the value of the real part of the impedance at the measurement point (indicated by an arrow in FIG. 5) having the smallest absolute value of the phase of the complex impedance was considered as a resistance value for the ionic conduction of the solid electrolyte of Example 1. The ionic conductivity was calculated from the following formula (1) using the resistance value of the electrolyte.

$$\sigma=(R_{SE}\times S/t)^{-1} \quad (1)$$

where σ is the ionic conductivity, S is the area of the electrolyte (in FIG. 4, the inside diameter of the die 201), $R_{SE}$ is the resistance value of the solid electrolyte in the above-mentioned impedance measurement, and t is the thickness of the electrolyte (in FIG. 4, the thickness of the solid electrolyte powder 100).

The ionic conductivity of the solid electrolyte material of Example 1 measured at 22° C. was $1.5\times10^{-4}$ S/cm.

Examples 2 to 30

(Production of Solid Electrolyte Material)

In Examples 2 to 30, as in Example 1, in an argon atmosphere with a dew point of lower than or equal to −60° C., LiCl and $YCl_3$ were weighed so as to satisfy a molar ratio of LiCl:$YCl_3$=6-3x:x. The "value x" in each Example is shown in Table 1 below.

These materials were pulverized and mixed with a mortar made of agate. The resulting mixture was placed in a crucible made of alumina, heated to 400 to 650° C. in an argon atmosphere, and held for 1 to 24 hours. In each Example, the "heat-treatment temperature" and "heat-treatment time" are shown in Table 1 below.

After heat-treatment under the corresponding heat-treatment conditions, pulverization was performed with a mortar made of agate to produce a solid electrolyte material of each of Examples 2 to 30.

(Evaluation of Ionic Conductivity)

By the same method as that of Example 1 described above, a conductivity measurement cell of each of Examples 2 to 30 was produced, and measurement of ionic conductivity was performed.

Reference Examples 1 and 2

(Production of Solid Electrolyte Material)

In Reference Example 1, in an argon atmosphere with a dew point of lower than or equal to −60° C., LiCl and $YCl_3$ were weighed so as to satisfy a molar ratio of LiCl:$YCl_3$=3:1. In Reference Example 2, in an argon atmosphere with a dew point of lower than or equal to −60° C., LiCl and YCl$_3$ were weighed so as to satisfy a molar ratio of LiCl:YCl$_3$=2.7:1.1. These materials were pulverized and mixed with a mortar made of agate. The resulting mixture was placed in a crucible made of alumina, heated to 300° C. in an argon atmosphere, and held for one hour.

After heat-treatment, the material was pulverized with a mortar made of agate to produce a solid electrolyte material of each of Reference Examples 1 and 2.

After heat-treatment, the material was pulverized with a mortar made of agate to produce a solid electrolyte material of each of Reference Examples 3 and 4.

(Evaluation of Ionic Conductivity)

By the same method as that of Example 1 described above, a conductivity measurement cell of each of Reference Examples 3 and 4 was produced, and measurement of ionic conductivity was performed.

The compositions and the evaluation results in Examples 1 to 30 and Reference Examples 1 to 4 are shown in Table 1.

TABLE 1

| | Starting material 1 | Starting material 2 | x | Composition | Heat-treatment temperature (° C.) | Heat-treatment time (hr) | Conductivity (S · cm$^{-1}$) |
|---|---|---|---|---|---|---|---|
| Example 1 | LiCl | YCl$_3$ | 1 | Li$_3$YCl$_6$ | 500 | 1 | 1.5 × 10$^{-4}$ |
| Example 2 | LiCl | YCl$_3$ | 1 | Li$_3$YCl$_6$ | 400 | 1 | 2.8 × 10$^{-6}$ |
| Example 3 | LiCl | YCl$_3$ | 1 | Li$_3$YCl$_6$ | 410 | 24 | 2.4 × 10$^{-5}$ |
| Example 4 | LICl | YCl$_3$ | 1 | Li$_3$YCl$_6$ | 450 | 1 | 6.8 × 10$^{-6}$ |
| Example 5 | LiCl | YCl$_3$ | 1 | Li$_3$YCl$_6$ | 480 | 1 | 1.4 × 10$^{-4}$ |
| Example 6 | LICl | YCl$_3$ | 1 | Li$_3$YCl$_6$ | 500 | 12 | 3.4 × 10$^{-5}$ |
| Example 7 | LiCl | YCl$_3$ | 1 | Li$_3$YCl$_6$ | 500 | 24 | 8.7 × 10$^{-5}$ |
| Example 8 | LiCl | YCl$_3$ | 1 | Li$_3$YCl$_6$ | 550 | 1 | 1.1 × 10$^{-4}$ |
| Example 9 | LiCl | YCl$_3$ | 1 | Li$_3$YCl$_6$ | 600 | 1 | 8.5 × 10$^{-5}$ |
| Example 10 | LiCl | YCl$_3$ | 1 | Li$_3$YCl$_6$ | 650 | 1 | 4.0 × 10$^{-5}$ |
| Example 11 | LiCl | YCl$_3$ | 1.05 | Li$_{2.85}$Y$_{1.05}$Cl$_6$ | 480 | 1 | 2.7 × 10$^{-4}$ |
| Example 12 | LICl | YCl$_3$ | 1.05 | Li$_{2.85}$Y$_{1.05}$Cl$_6$ | 500 | 1 | 2.9 × 10$^{-4}$ |
| Example 13 | LiCl | YCl$_3$ | 1.05 | Li$_{2.85}$Y$_{1.05}$Cl$_6$ | 550 | 1 | 3.9 × 10$^{-4}$ |
| Example 14 | LiCl | YCl$_3$ | 1.05 | Li$_{2.85}$Y$_{1.05}$Cl$_6$ | 600 | 1 | 7.4 × 10$^{-5}$ |
| Example 15 | LiCl | YCl$_3$ | 1.1 | Li$_{2.7}$Y$_{1.1}$Cl$_6$ | 400 | 1 | 1.4 × 10$^{-6}$ |
| Example 16 | LiCl | YCl$_3$ | 1.1 | Li$_{2.7}$Y$_{1.1}$Cl$_6$ | 450 | 1 | 4.8 × 10$^{-6}$ |
| Example 17 | LiCl | YCl$_3$ | 1.1 | Li$_{2.7}$Y$_{1.1}$Cl$_6$ | 450 | 10 | 6.6 × 10$^{-5}$ |
| Example 18 | LiCl | YCl$_3$ | 1.1 | Li$_{2.7}$Y$_{1.1}$Cl$_6$ | 480 | 1 | 1.5 × 10$^{-4}$ |
| Example 19 | LiCl | YCl$_3$ | 1.1 | Li$_{2.7}$Y$_{1.1}$Cl$_6$ | 500 | 1 | 3.5 × 10$^{-4}$ |
| Example 20 | LiCl | YCl$_3$ | 1.1 | Li$_{2.7}$Y$_{1.1}$Cl$_6$ | 500 | 10 | 3.6 × 10$^{-4}$ |
| Example 21 | LiCl | YCl$_3$ | 1.1 | Li$_{2.7}$Y$_{1.1}$Cl$_6$ | 550 | 1 | 1.1 × 10$^{-4}$ |
| Example 22 | LiCl | YCl$_3$ | 1.1 | Li$_{2.7}$Y$_{1.1}$Cl$_6$ | 550 | 10 | 1.9 × 10$^{-5}$ |
| Example 23 | LiCl | YCl$_3$ | 1.1 | Li$_{2.7}$Y$_{1.1}$Cl$_6$ | 600 | 1 | 3.7 × 10$^{-4}$ |
| Example 24 | LiCl | YCl$_3$ | 1.1 | Li$_{2.7}$Y$_{1.1}$Cl$_6$ | 650 | 1 | 6.2 × 10$^{-5}$ |
| Example 25 | LiCl | YCl$_3$ | 0.6 | Li$_{4.2}$Y$_{0.6}$Cl$_6$ | 500 | 24 | 1.9 × 10$^{-5}$ |
| Example 26 | LiCl | YCl$_3$ | 0.7 | Li$_{3.9}$Y$_{0.7}$Cl$_6$ | 500 | 24 | 2.9 × 10$^{-5}$ |
| Example 27 | LiCl | YCl$_3$ | 0.8 | Li$_{3.6}$Y$_{0.8}$Cl$_6$ | 500 | 24 | 3.7 × 10$^{-5}$ |
| Example 28 | LiCl | YCl$_3$ | 0.9 | Li$_{3.3}$Y$_{0.9}$Cl$_6$ | 500 | 24 | 4.2 × 10$^{-5}$ |
| Example 29 | LiCl | YCl$_3$ | 1.15 | Li$_{2.55}$Y$_{1.15}$Cl$_6$ | 560 | 24 | 3.0 × 10$^{-4}$ |
| Example 30 | LiCl | YCl$_3$ | 1.2 | Li$_{2.4}$Y$_{1.2}$Cl$_6$ | 560 | 2 | 2.0 × 10$^{-4}$ |
| Reference Example 1 | LiCl | YCl$_3$ | 1 | Li$_3$YCl$_6$ | 300 | 1 | 1.2 × 10$^{-7}$ |
| Reference Example 2 | LiCl | YCl$_3$ | 1.1 | Li$_{2.7}$Y$_{1.1}$Cl$_6$ | 300 | 1 | 4.2 × 10$^{-7}$ |
| Reference Example 3 | LiCl | YCl$_3$ | 1 | Li$_3$YCl$_6$ | 500 | 60 | 2.5 × 10$^{-8}$ |
| Reference Example 4 | LiCl | YCl$_3$ | 1.1 | Li$_{2.7}$Y$_{1.1}$Cl$_6$ | 500 | 60 | 8.6 × 10$^{-9}$ |

(Evaluation of Ionic Conductivity)

By the same method as that of Example 1 described above, a conductivity measurement cell of each of Reference Examples 1 and 2 was produced, and measurement of ionic conductivity was performed.

Reference Examples 3 and 4

In Reference Example 3, in an argon atmosphere with a dew point of lower than or equal to −60° C., LiCl and YCl$_3$ were weighed so as to satisfy a molar ratio of LiCl:YCl$_3$=3:1. In Reference Example 4, in an argon atmosphere with a dew point of lower than or equal to −60° C., LiCl and YCl$_3$ were weighed so as to satisfy a molar ratio of LiCl:YCl$_3$=2.7:1.1. These materials were pulverized and mixed with a mortar made of agate. The resulting mixture was placed in a crucible made of alumina, heated to 500° C. in an argon atmosphere, and held for 60 hours.

CONSIDERATIONS

As in Reference Examples 1 and 2, in the case where the heat-treatment temperature is 300° C., the ionic conductivity at around room temperature is low at the order of 10$^{-7}$ S/cm. As in Reference Examples 3 and 4, in the case where the heat-treatment time is 60 hours, which is long, the ionic conductivity is low at 10$^{-9}$ to 10$^{-8}$ S/cm. In contrast, in Examples 1 to 30, the ionic conductivity at around room temperature is high at more than or equal to 1×10$^{-6}$ S/cm. The reason for this is considered to be that in the case where the heat-treatment temperature is 300° C., the solid phase reaction is insufficient. Furthermore, in the case where the heat-treatment time is 60 hours, which is long, there is a possibility that the halide might have volatilized, resulting in a compositional change or the like.

In the case where the heat-treatment temperature is in the range of 480 to 600° C., a higher ionic conductivity is exhibited. The reason for this is considered to be that a solid electrolyte having high crystallinity has been achieved. For example, when compared at the same starting material mixing ratio and heat-treatment time, in Example 4 in which the heat-treatment temperature is 450° C., the ionic conductivity is $6.8 \times 10^{-6}$ S/cm, while in Example 5 in which the heat-treatment temperature is 480° C., the ionic conductivity is $1.4 \times 10^{-4}$ S/cm. Furthermore, in Example 9 in which the heat-treatment temperature is 600° C., the ionic conductivity is $8.5 \times 10^{-5}$ S/cm, while in Example 10 in which the heat-treatment temperature is 650° C., the ionic conductivity is $4.0 \times 10^{-5}$ S/cm. The reason for this is considered to be that since heat-treatment is performed at a temperature higher than the melting point of LiCl, LiCl is decomposed before completion of the reaction with $YCl_3$.

From the above results, it is evident that the solid electrolyte material synthesized by the production method according to the present disclosure has high lithium ion conductivity. Furthermore, the production method according to the present disclosure is a simple and easy method and a method having industrially high productivity.

The production method according to the present disclosure can be used, for example, as a production method for producing a solid electrolyte material. Furthermore, the solid electrolyte material produced by the production method according to the present disclosure can be used, for example, in all-solid-state lithium secondary batteries.

What is claimed is:

1. A production method for producing a halide comprising heat-treating, in an inert gas atmosphere, a mixed material in which only LiCl and $YCl_3$ are mixed,
   wherein the mixed material is heat-treated at higher than or equal to 200° C. and lower than or equal to 650° C., and
   wherein the mixed material is heat-treated for more than or equal to 1 hour and less than or equal to 24 hours.

2. The production method according to claim 1, wherein the mixed material is heat-treated at higher than or equal to 400° C. and lower than or equal to 650° C.

3. The production method according to claim 2, wherein the mixed material is heat-treated at higher than or equal to 480° C.

4. The production method according to claim 2, wherein the mixed material is heat-treated at lower than or equal to 600° C.

5. The production method according to claim 1, wherein the mixed material is heat-treated for less than or equal to 10 hours.

* * * * *